Figure 1:
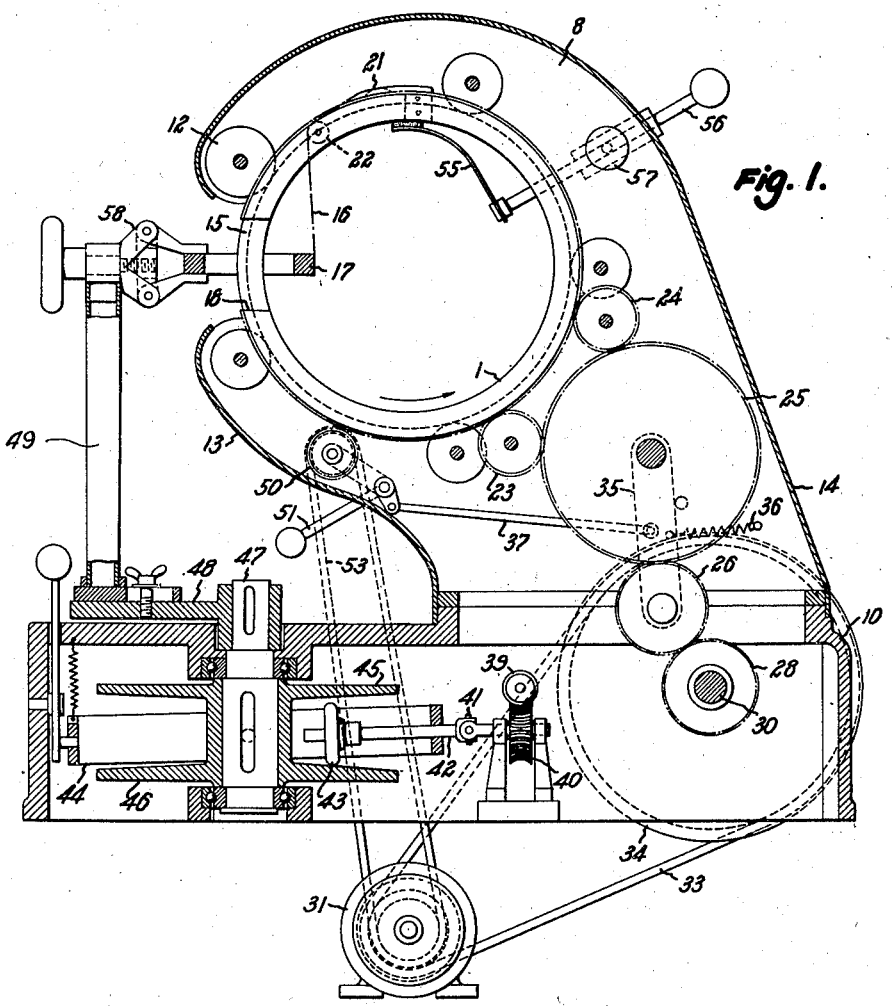

June 29, 1948.                O. WIRTH                2,444,126
                         RING WINDING MACHINE
Filed Feb. 5, 1945                              3 Sheets-Sheet 1

Inventor:
Otto Wirth,
By Pierce & Scheffler,
Attorneys.

June 29, 1948.   O. WIRTH   2,444,126
RING WINDING MACHINE
Filed Feb. 5, 1945   3 Sheets-Sheet 2

Inventor:
Otto Wirth,
By
Pierce & Scheffler,
Attorneys.

June 29, 1948.　　　　　O. WIRTH　　　　　2,444,126
RING WINDING MACHINE
Filed Feb. 5, 1945　　　　　　　　　　　　3 Sheets-Sheet 3

Inventor:
Otto Wirth,
By
Pierce & Scheffler,
Attorneys.

Patented June 29, 1948

2,444,126

UNITED STATES PATENT OFFICE 2,444,126

RING WINDING MACHINE

Otto Wirth, Zurich, Switzerland, assignor to Micafil Ltd., Zurich, Switzerland

Application February 5, 1945, Serial No. 576,203
In Germany January 20, 1944

8 Claims. (Cl. 242—4)

Ring winding machines serve to wind closed or open rings of iron, synthetic or ceramic material, wood, wire or sheet metal, with wire, cord, paper or cloth tape. Up to the present these machines consisted of a travelling ring positively actuated at two points on its circumference, with an opening for the introduction of the ring which had to be wound and a guide roller for the winding material, as well as an annular shuttle arranged coaxially with and of the same size as the travelling ring, said shuttle carrying the winding material and when winding the ring being actuated by the travelling ring due to friction or by means of a special coupling. In order to be able to wind as much winding material on to the shuttle as possible, it is usual to make the diameter of the shuttle and the travelling ring considerably larger than the cross sectional circumference of the ring which is to be wound. The ring which is to be wound is interlocked with the shuttle and travelling ring in such a manner that the pair of rings passes through the axis of the ring which is to be wound and continuously winds material around the latter. Due to the different diameters of the rings the distance of the supply point of the winding material on the shuttle from the ring which is to be wound varies, so that the wire guide roller is at one time very near and at another time a long way away from the ring which is to be wound. When in the most distant position more wire is pulled out of the shuttle than is required for a turn of the wire; the wire slackens so that the wire turns on the ring become loose. At this moment the shuttle is retarded until winding material has to be drawn out again. This braking action occurs automatically but in practice never at the right moment, because the necessity for drawing wire from the shuttle varies in time as the thickness of the winding on the ring increases. With such machines it is therefore impossible for instance to wind a ring with several layers of fine wire with a uniform wire tension.

According to the invention the disadvantages of the known ring winding machines are avoided by the shuttle, which is of the same size as the travelling ring and is arranged coaxially with the former, being guided by at least five rollers supported in ball bearings, the shuttle being provided with an uncontrolled brake which can be adjusted by hand and by means of which the shuttle is uniformly retarded during the winding process.

Figure 2:
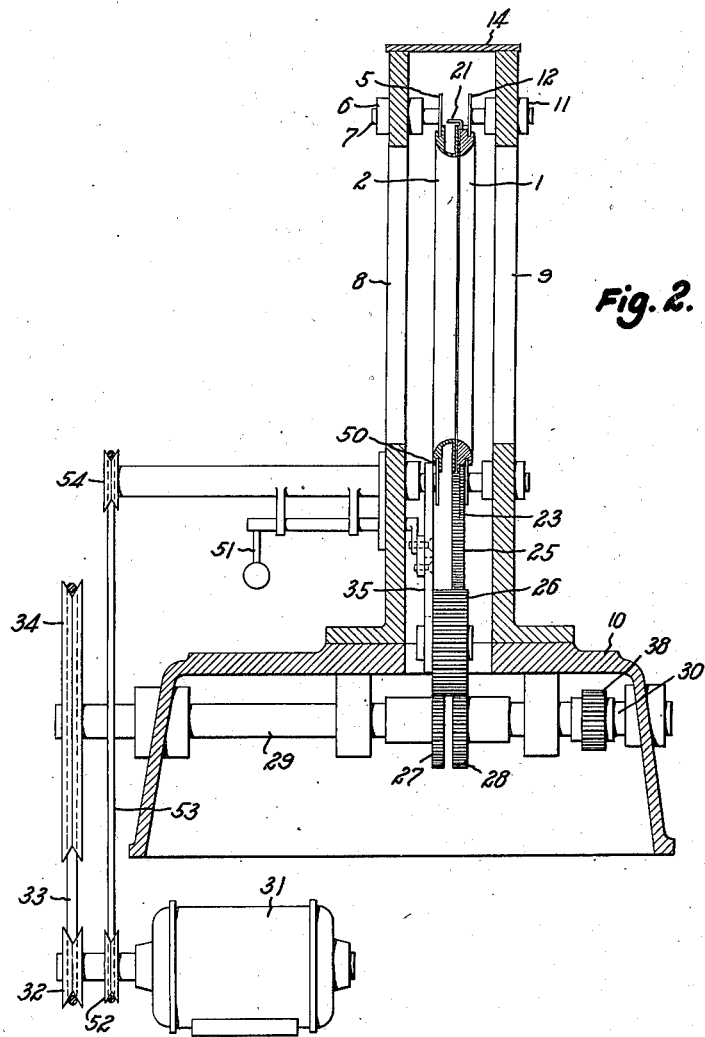
Figure 3:
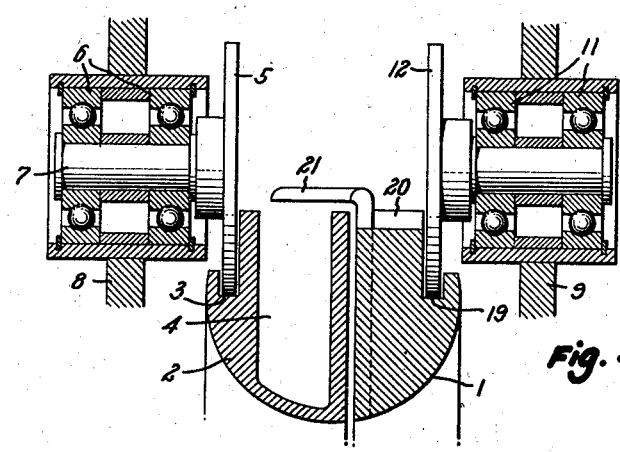
Figure 4:
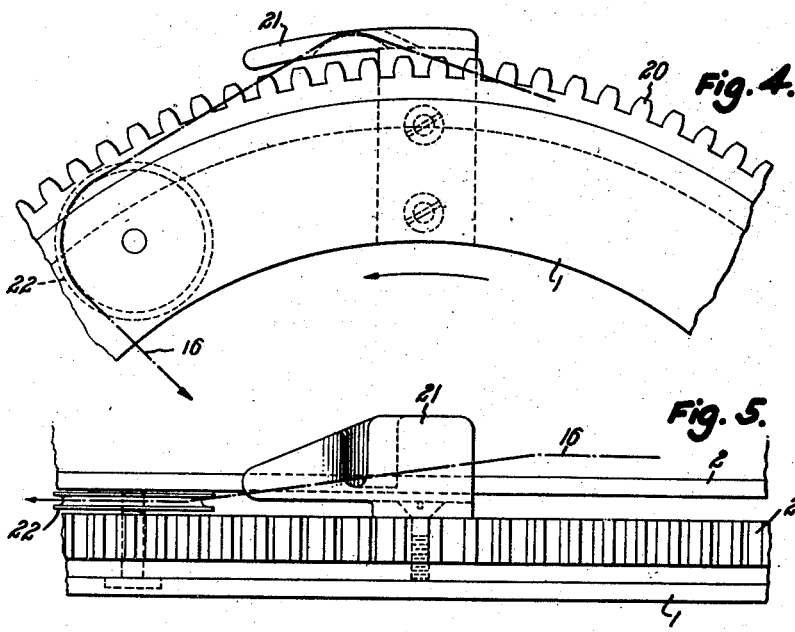
Figure 5:
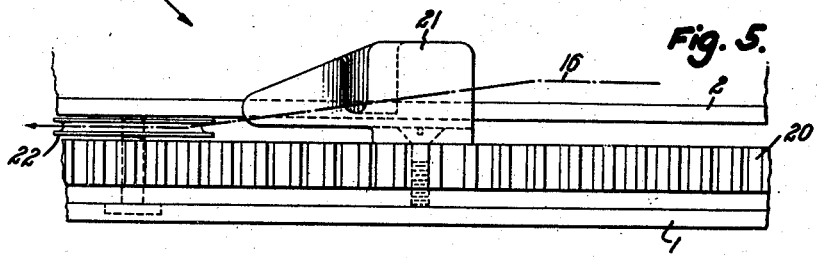

A constructional example of a wire ring winding machine according to the invention is illustrated in the accompanying drawings where Fig. 1 shows a longitudinal sectional view and Fig. 2 a cross-sectional view of the machine. Figs. 3–5 show to an enlarged scale a sectional view, elevation and plan respectively of the travelling ring and shuttle at the point where the wire is drawn from the shuttle by the travelling ring.

Travelling ring 1 and shuttle 2 which are mounted for independent rotation together have a combined cross-section the periphery of which in a radially inward direction approximates a half circle, as shown in Fig. 3, it being noted that the peripheral portion of the shuttle 2 extends for slightly more than a quarter circle. The shuttle is provided with a large groove 4 for the reception of the winding wire and a smaller guide groove 3 in which five guide rollers 5 engage, these rollers being supported in double roller bearings 6. The diameter of these guide rollers 5 is at least three times as big as the diameter of their axles 7, because it is important that the shuttle 2 should operate as nearly as possible without friction. Bearings 6 are mounted on an arm 8 of the machine column, whilst the other arm 9 supports the ball bearings 11 of the guide rollers 12 for the travelling ring 1, these latter rollers being of the same size and construction as those provided for the shuttle 2. Arms 8 and 9 of the machine column are provided with cover plates 13, 14 so as to form a closed casing. Shuttle 2 is provided with a removable segment 15 which is removed when the ring 17 which is to be wound with wire 16 is introduced, this segment being subsequently replaced.

For this purpose travelling ring 1 possesses an equally large gap 18 which cannot be closed, however, and which is shown here at the same place as segment 15, that is at the point where ring 17 is introduced. Ring 1 is also provided with a narrow guide groove 19 for guide rollers 12 and possesses an external toothed rim 20. It also carries a tongue-shaped hardened and polished wire guiding element 21 which extends over shuttle 2 and is provided with an oblique slot 21a for the wire, as well as the wire guide roller 22 from which the winding wire 16 passes to ring 17 in a wide bend practically without friction.

In order to bridge over gap 18 travelling ring 1 is driven by two gear wheels 23, 24 which are spaced a greater distance apart than the length of the gap. Further intermediate wheels 25, 26, 27, 28 lead to shafts 29, 30 which are driven by electric motor 31 over belt transmission gear 32, 33, 34. Shafts 29 and 30 are coaxial but not connected together. They are, however, coupled by means of gear wheel 26 which engages both wheels 27 and 28, wheel 26 being capable of being swung out of engagement by means of lever 51 which actuates levers 35, 37 against the tension of spring 36.

The feed for ring 17 which is to be wound is actuated from shaft 30 over a gear wheel 38 and an intermediate gearing not visible in the drawing. This drive is achieved by means of worm 39 and worm wheel 40, which by means of a Cardan coupling 41 actuates shaft 42 together with friction pinion 43 the latter being adjustable in the longitudinal direction. According as to whether pinion 43 is pressed by ring lever 44 against the upper friction wheel 45 or the lower friction wheel 46, feed shaft 47 together with ring support 49, which is adjustably mounted on arm 48, will rotate in one or the other direction corresponding to the winding pitch on ring 17.

In order that the supply groove 4 of shuttle 2 can be filled with wire 16 it must have an independent drive. This is achieved when gear wheel 26 is disengaged from wheels 27 and 28, due to friction roller 50 being at the same time pressed into groove 3 on shuttle 2 by means of lever 51, whereby belt transmission 52, 53, 54 which otherwise runs unloaded causes shuttle 2 to be rotated comparatively rapidly in the opposite direction to that in which travelling ring 1 moves. The speed is preferably selected to be five to six times higher than for ring winding. By disengaging gear wheels 26, 27 and 28 the drive for the travelling ring 1 and also that of the feed device 38—46 is brought to a standstill whilst wire 16 is being wound on to the shuttle.

During this winding-on process brake 55 is of course also released from shuttle 2 by swivelling its supporting rod 56 about pivot 57. When ring 17 is being wound brake 55 must, however, be applied with a certain pressure which can be finely adjusted by a radial displacement of its supporting rod 56, so that the shuttle does not run quicker than the wire can be drawn off it. During operation there is no need for brake 55 to have any automatic control.

If ring 17 is to be wound in sectors, as shown in the drawing, then it is held in a clamp 58 and the feed, after each wire layer has been applied to the corresponding sector of ring 17, for instance one half of the ring, is allowed to change its direction of rotation by reversing friction pinion 43, until the desired number of turns or layers have been reached. Thereupon ring 17 is released and the wound half is fixed in clamp 58 so that the empty half can then be wound.

Instead of a feed device which swings backwards and forwards it is possible to arrange a device on shaft 47 which moves forward continuously.

In order to wind a ring with wire, first of all segment 15 is removed from shuttle 2 and the gap is brought into coincidence with gap 18 in the travelling ring. Then ring 17 is fixed in clamp 58 and segment 15 replaced, whereupon ring 17 is centred in such a manner that the circle formed by the cross-sections of shuttle 2 and travelling ring 1 lies in the axis of ring 17. The beginning of the wire is then fastened to the shuttle, gear wheel 26 is disengaged by means of lever 51 and friction roller 50 pressed into groove 3 in shuttle 2; motor 31 is switched in and allowed to run until the predetermined number of turns of wire are wound on to the shuttle, this being indicated by a counter not shown in the drawing.

The counter can be provided with a device for automatically switching out motor 31 when the desired number of turns have been reached. After the motor has been stopped, the brake applied to the shuttle and roller 50 disengaged from groove 3, the end of the wire which forms the beginning of the ring winding is pulled over wire guiding element 21 and roller 22 and fastened to ring 17. By releasing lever 51 gear wheel 26 is brought into engagement with wheels 27 and 28 again, motor 31 is then switched in again and brake 55 adjusted. The motor now drives travelling ring 1 by means of wheels 27, 28 and pulls wire 16 so that the shuttle rotates. The speed of the shuttle varies continuously between two extreme values, one of which is determined by the maximum distance and the other by the minimum distance of the wound point on the circumference or ring 17 from wire guide roller 22. For this reason when the inside of ring 17 is being wound the speed of shuttle 2 is greater, and when the outside of ring 17 is being wound less than that of travelling ring 1. Brake 55 must therefore be so adjusted that the wire always remains taut between ring 17 and guide roller 22. In theory the wire is thus always kept under uniform tension by the frictional power of brake 55; in practice there is, however, also the power required to accelerate the shuttle every revolution. The more smoothly and easily the shuttle rotates, the less winding material there is on the shuttle and the lighter this material is, the more nearly will the theoretical optimum conditions be approached. The smooth and easy running of the shuttle is on the one hand due to the five rollers 5 and the ball bearings 6 for the thin roller axles 7 which at the most have a diameter equal to one third of that of the rollers 5 and should be connected to the inside ring of the ball bearings, and on the other hand due to the very light weight of the shuttle itself.

The correct feed during winding is obtained by an axial displacement of friction pinion 43 on its shaft 42. After the ring sector (e. g., a half ring) has been wound, ring lever 44 is reversed, so that pinion 43 which has been in contact with friction disc 46 now comes into contact with friction disc 45, and shaft 47 then rotates in the opposite direction.

In the drawing only one constructional form of the invention is shown and many modifications in the construction are possible. With a suitable form of shuttle and guide device the machine can also be used for winding a ring with tape or paper strip.

I claim:

1. In a machine for winding rings with flexible winding material; a traveling ring, said ring having opening means for introducing the ring to be wound, and a guide roller for said winding material; means supporting said traveling ring for rotation on its axis; means driving said traveling ring in rotation; a ring shaped shuttle, said shuttle being of the same diameter as said traveling ring and including a peripheral groove, at least five anti-friction journaled rollers spaced around said shuttle engaging the groove therein, said rollers being positioned to support said shuttle closely adjacent to and coaxial with said traveling ring; a disengageable driving means for said shuttle including a rotated member movable into engagement with said shuttle to wind on said winding material; and braking means for said shuttle, said braking means being manually adjustable to vary the retarding force applied to said shuttle as the latter rotates with said traveling ring during a winding operation of said ring.

2. A winding machine as defined in claim 1 wherein said shuttle braking means includes a brake shoe engaging the surface of said shuttle during a ring winding operation and means disengaging said brake shoe from said surface when winding material is wound on said shuttle.

3. A winding machine as defined in claim 1 wherein said traveling ring and shuttle have a combined cross-section, the periphery of which in a radially inward direction approximates a half-circle, the peripheral portion of said shuttle extending for slightly more than a quarter circle.

4. A winding machine as defined in claim 1 characterized by the feature that the rotary member of the disengageable shuttle driving means comprises a friction roller movable into contact with the groove in said shuttle.

5. A winding machine as defined in claim 1 characterized by the feature that the rotary member of the disengageable shuttle driving means comprises a friction roller movable into contact with the groove in said shuttle, and wherein said disengageable drive is actuated by the driving means for said traveling ring at a speed considerably greater than the speed of said traveling ring during a ring winding operation.

6. In a machine for winding rings with flexible winding material; a traveling ring, said ring having a guide roller for said winding material; means supporting said traveling ring for rotation on its axis through said ring; a drive for said traveling ring; a ring shaped shuttle of the same diameter as said traveling ring, said shuttle including a peripheral groove and positioned closely adjacent to and coaxially with said traveling ring; means supporting said shuttle for rotation on its axis comprising at least five anti-friction journaled rollers spaced around said shuttle and engaging the groove therein; a drive for said shuttle, said drive including a rotated member movable into engagement with said shuttle to wind on said winding material; braking means for said shuttle, said braking means being manually adjustable to vary the retarding force applied to said shuttle during winding of said ring; a feed device turning said ring about its axis as material is wound thereon; a drive for said feed device; and control means for said drives, said control means being arranged to bring said rotated member into engagement with said shuttle and to simultaneously interrupt the drives for said traveling ring and feed device, and vice versa.

7. A winding machine as defined in claim 6 wherein the drive for said traveling ring comprises a first set of gears including a gear meshed with a toothed rim on said traveling ring, a driven shaft and a pinion gear thereon, wherein the drive for said feed device includes a shaft and a pinion gear thereon, and wherein both said drives include a gear disengageably meshed with said pinion gears and a gear of said first gear set.

8. A winding machine as defined in claim 6 wherein said control means comprises commonly operated linkage means.

OTTO WIRTH.

REFERENCES CITED

The following references are of record in the file of this patent:

UNITED STATES PATENTS

| Number | Name | Date |
| --- | --- | --- |
| 1,994,661 | Pash | Mar. 19, 1935 |
| 2,230,363 | Pash | Feb. 4, 1941 |

FOREIGN PATENTS

| Number | Country | Date |
| --- | --- | --- |
| 7,437 | Great Britain | 1914 |
| 83,922 | Sweden | May 23, 1935 |